US008468521B2

(12) United States Patent
Pawlowski

(10) Patent No.: US 8,468,521 B2
(45) Date of Patent: Jun. 18, 2013

(54) SYSTEM AND METHOD FOR UTILIZING A VIRTUALIZED COMPUTE CLUSTER AS AN EXECUTION ENGINE FOR A VIRTUAL MACHINE OF A STORAGE SYSTEM CLUSTER

(75) Inventor: Brian Pawlowski, Palo Alto, CA (US)

(73) Assignee: NetApp, Inc., Sunnyvale, CA (US)

( * ) Notice: Subject to any disclaimer, the term of this patent is extended or adjusted under 35 U.S.C. 154(b) by 1394 days.

(21) Appl. No.: 11/925,133

(22) Filed: Oct. 26, 2007

(65) Prior Publication Data

US 2009/0113420 A1 Apr. 30, 2009

(51) Int. Cl.

| | |
|---|---|
| ***G06F 9/455*** | (2006.01) |
| ***G06F 13/00*** | (2006.01) |
| ***G06F 15/16*** | (2006.01) |
| ***G06F 15/167*** | (2006.01) |
| ***G06F 15/173*** | (2006.01) |

(52) U.S. Cl.

USPC ............... 718/1; 711/113; 711/118; 709/201; 709/202; 709/203; 709/212; 709/216; 709/217; 709/218; 709/219; 709/223; 709/224; 709/225; 709/229; 709/238

(58) Field of Classification Search

None

See application file for complete search history.

(56) References Cited

U.S. PATENT DOCUMENTS

| | | | | |
|---|---|---|---|---|
| 6,587,937 | B1 * | 7/2003 | Jensen et al. | 711/173 |
| 6,704,925 | B1 * | 3/2004 | Bugnion | 717/138 |
| 7,020,800 | B2 | 3/2006 | Fu et al. | |
| 7,039,828 | B1 | 5/2006 | Scott | |
| 7,203,944 | B1 | 4/2007 | Van Rietschote et al. | |
| 7,213,246 | B1 | 5/2007 | van Rietschote et al. | |
| 7,266,637 | B1 | 9/2007 | van Rietschote et al. | |
| 7,299,468 | B2 * | 11/2007 | Casey et al. | 718/104 |
| 7,313,637 | B2 | 12/2007 | Tanaka et al. | |
| 7,581,064 | B1 * | 8/2009 | Zedlewski et al. | 711/118 |
| 7,581,066 | B2 * | 8/2009 | Marwinski et al. | 711/129 |
| 7,607,129 | B2 * | 10/2009 | Rosu et al. | 718/1 |
| 7,673,113 | B2 * | 3/2010 | Sugumar et al. | 711/170 |
| 7,680,987 | B1 * | 3/2010 | Clark et al. | 711/147 |
| 7,702,743 | B1 * | 4/2010 | Wong | 709/216 |
| 7,716,667 | B2 * | 5/2010 | van Rietschote et al. | 718/1 |
| 7,788,665 | B2 * | 8/2010 | Oshins | 718/1 |
| 7,831,634 | B2 * | 11/2010 | Petev et al. | 707/803 |
| 2002/0029283 | A1 * | 3/2002 | Beckett et al. | 709/231 |

(Continued)

OTHER PUBLICATIONS

Nelson, Michael, et al., "Fast Transparent Migration for Virtual Machines," 2005 USENIX Annual Technical Conference, Apr. 10-15, 2005, pp. 391-394, Anaheim, CA.

(Continued)

*Primary Examiner* — Emerson Puente
*Assistant Examiner* — Adam Lee
(74) *Attorney, Agent, or Firm* — Cesari and McKenna, LLP

(57) ABSTRACT

A system and method employs one or more clients of a virtualized compute cluster as an execution engine for a portion of a storage operating system implemented as a virtual machine on a storage system node of a storage system cluster. If there is processing bandwidth of a client that is not fully utilized and the load on the storage system node is high, the portion of the storage operating system is ported to the client of the compute cluster in a manner that externally distributes the storage architecture from the storage system cluster. Advantageously, the processing performance of the storage system cluster is improved by, among other things, offloading some of the network processing load from the storage system node.

24 Claims, 7 Drawing Sheets

U.S. PATENT DOCUMENTS

| | | | | |
|---|---|---|---|---|
| 2002/0038301 | A1* | 3/2002 | Aridor et al. | 707/10 |
| 2002/0116593 | A1 | 8/2002 | Kazar et al. | |
| 2005/0010615 | A1* | 1/2005 | Cypher et al. | 707/201 |
| 2005/0160132 | A1* | 7/2005 | Van Doren et al. | 709/200 |
| 2005/0246401 | A1 | 11/2005 | Edwards et al. | |
| 2005/0251808 | A1* | 11/2005 | Gbadegesin et al. | 719/310 |
| 2006/0230407 | A1 | 10/2006 | Rosu et al. | |
| 2006/0236069 | A1* | 10/2006 | Kalach et al. | 711/173 |
| 2006/0248273 | A1* | 11/2006 | Jernigan et al. | 711/114 |
| 2006/0248285 | A1* | 11/2006 | Petev | 711/141 |
| 2007/0101069 | A1 | 5/2007 | Corbett et al. | |
| 2007/0156969 | A1* | 7/2007 | Tian et al. | 711/141 |
| 2008/0028398 | A1* | 1/2008 | Cherkasova et al. | 718/1 |
| 2008/0270825 | A1 | 10/2008 | Goodson et al. | |
| 2009/0006755 | A1* | 1/2009 | Illikkal et al. | 711/126 |
| 2009/0025007 | A1* | 1/2009 | Hara et al. | 718/105 |

OTHER PUBLICATIONS

Network Appliance, Inc., "PCT Notification of Transmittal of the International Search Report and the Written Opinion of the international Searching Authority, or the Declaration", International Application No. PCT/US2008/011503, International Filing Date: Oct. 6, 2008, mailed Dec. 10, 2009, 15 pages.

"Notification of Transmittal of the International Search Report and the Written Opinion of the International Searching Authority, or the Declaration," International Filing Date: Apr. 28, 2008, International Application No. PCT/US2008/005442, Applicant: Network Appliance, Inc., Date of Mailing: Feb. 20, 2009, pp. 1-14.

* cited by examiner

600

| VOLUME ID | 605 |
| --- | --- |
| AGGREGATE ID | 610 |
| • • • | 615 |

| AGGREGATE ID | 705 |
| --- | --- |
| D-MODULE ID | 710 |
| • • • | 715 |

FIG. 7

SYSTEM AND METHOD FOR UTILIZING A VIRTUALIZED COMPUTE CLUSTER AS AN EXECUTION ENGINE FOR A VIRTUAL MACHINE OF A STORAGE SYSTEM CLUSTER

FIELD OF THE INVENTION

The invention relates to virtual machine environments and, more specifically, to utilization of a virtualized computer cluster as an execution engine for a virtual machine of a storage system cluster.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a host computer or client. The storage devices are typically disk drives organized as a disk array, wherein the term “disk” commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access data containers stored on the system. The clients may be interconnected in a tightly-coupled configuration and organized as a compute cluster to facilitate load balancing and availability of services. In this model, each client may comprise an application executing on a computer, e.g., an application server, of the cluster that “connects” to the storage system over a computer network, such as a point-to-point link, shared local area network (LAN), wide area network (WAN), or virtual private network (VPN) implemented over a public network such as the Internet. The client may request the services of the storage system by issuing file-based and block-based protocol data access requests (in the form of packets) to the system over the network.

A virtual machine environment illustratively includes a computer, such as a client and/or storage system, executing a virtual machine operating system as well as one or more “guest” operating systems to essentially implement virtual machines on the client and/or storage system. Each guest operating system may comprise a conventional operating system, such as the Linux operating system, or a specialized operating system, such as a storage operating system. The virtual machine environment may also include a plurality of guest operating systems (or portions of a guest operating system) executing on each client within a virtual machine cluster environment, such as a virtualized compute cluster. In this latter environment, each client of the virtualized compute cluster may request the services of the storage system by accessing data containers stored on the system.

Over time, storage processing performance of the storage system may degrade as the data access request load originating from the compute cluster increases. A common solution to this problem is to interconnect a plurality of storage systems to provide a storage system cluster configured to service the clients of the compute cluster. Each storage system or node may be configured to service one or more volumes of disks, wherein each volume stores one or more data containers, such as files and logical units. Alternatively, the volumes serviced by the particular storage system node may be distributed among all of the nodes of the storage system cluster. This configuration distributes the data access requests, along with the processing resources needed to service such requests, among all of the storage system nodes, thereby reducing the individual processing load on each node.

Another solution is to provide a proxy caching system that includes a front-end proxy device having local storage, i.e., a “network cache”, coupled to a back-end storage system or node having remote storage. The network cache is configured to locally store (“cache”) certain data that may be used to service certain data access requests from the clients. In particular, data access requests directed to the cached data are serviced by the network cache, thereby offloading servicing of those requests from the storage system node while allowing the node to perform other useful storage processing functions.

SUMMARY OF THE INVENTION

The invention relates to system and method for employing one or more clients of a virtualized compute cluster as an execution engine for a portion of a storage operating system implemented as a virtual machine on a storage system node of a storage system cluster. Each storage system node and client executes a virtual machine operating system comprising a hypervisor module configured to mask low-level hardware operations from one or more guest operating systems executing on the virtual machine operating system. A plurality of domains is illustratively disposed over the hypervisor module, wherein each domain is representative of a virtual machine within which a guest operating system (or a portion thereof) executes.

In an illustrative embodiment, each node of the storage system cluster is organized as a network module (N-module) and a disk module (D-module). The D-module is embodied as a high availability data layout portion of the storage operating system that services one or more storage devices, such as disks, whereas the N-module is embodied as a network-facing portion of the storage operating system that terminates a network connection for block or file protocols from a client of the virtualized compute cluster. The N- and D-modules of the storage system node cooperate with N- and D-modules of other storage system nodes to provide a distributed storage architecture of the storage system cluster. Notably, each N-module and D-module operates in a virtual machine of each storage system node.

According to the invention, an N-module may be ported as a virtual machine from a node of the storage system cluster to a client to absorb (utilize) available processing bandwidth of the virtualized compute cluster. That is, if there is processing bandwidth of the client that is not fully utilized and the load on the storage system node is high, the invention enables porting of the N-module to the client of the compute cluster to thereby utilize that processing bandwidth of the client as an execution engine in a manner that externally distributes the storage architecture from the storage system cluster. Thereafter, instances of the ported N-module may be spawned any number of times to execute over the hypervisor module within any number of clients to absorb available processing bandwidth of the compute cluster. Advantageously, the invention increases the processing performance of the storage system cluster by, among other things, offloading some of the network processing load from the storage system node.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 6 is a schematic block diagram of a volume location database (VLDB) volume entry in accordance with an illustrative embodiment of the present invention;

FIG. 7 is a schematic block diagram of a VLDB aggregate entry in accordance with an illustrative embodiment of the present invention.

DETAILED DESCRIPTION OF AN ILLUSTRATIVE EMBODIMENT

Figure 1:
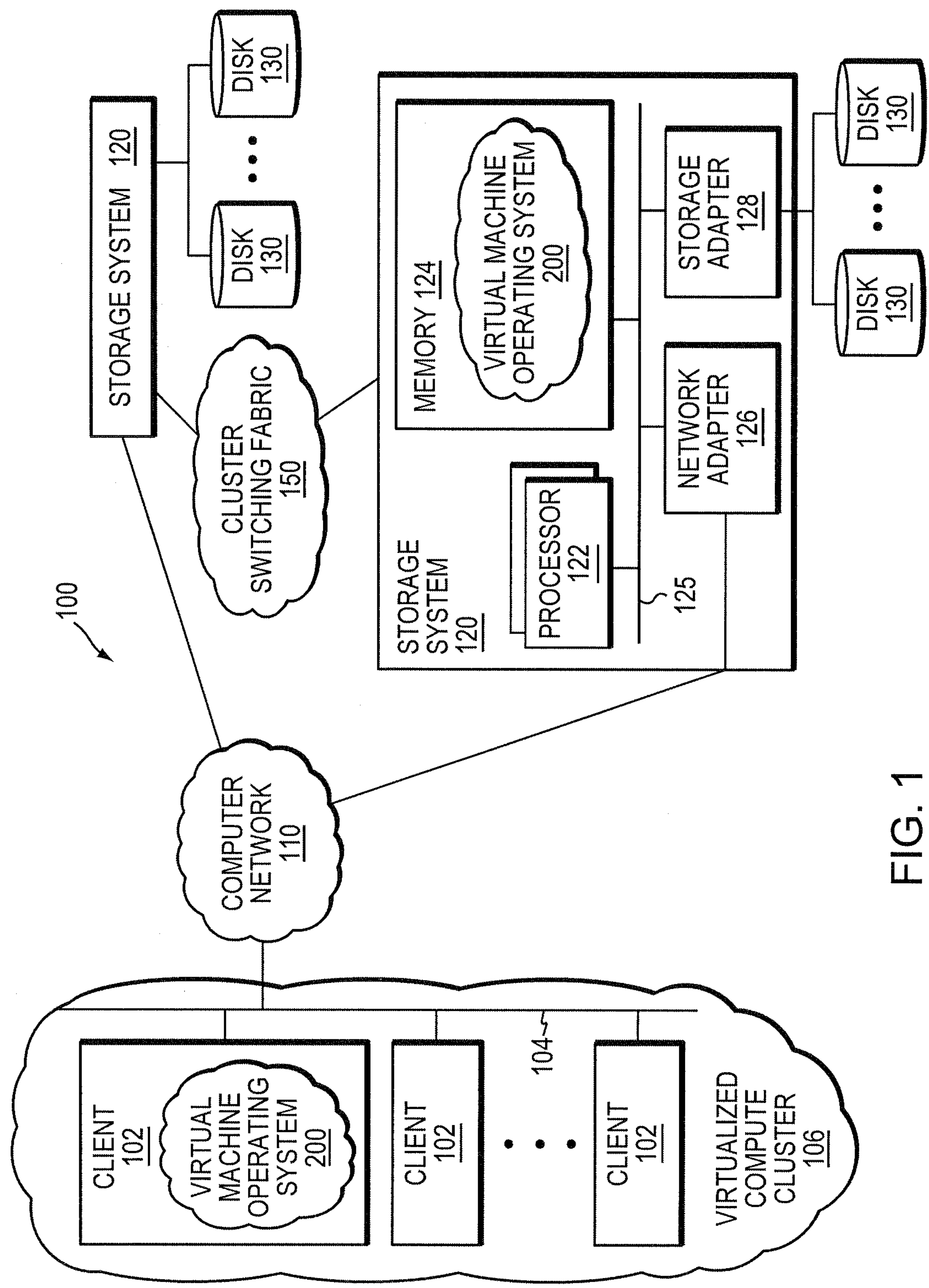
FIG. 1 is a schematic block diagram of an exemplary storage system environment in accordance with an illustrative embodiment of the present invention.

FIG. 1 is a schematic block diagram of a storage system environment 100 including a plurality of clients 102 coupled to one or more storage systems 120 over a computer network 110 in accordance with an illustrative embodiment of the present invention. The clients 102 may be embodied as host systems that are interconnected by a communication link 104, such as a local area network (LAN), and organized as a virtualized compute cluster 106. Each storage system 120 may be embodied as a multi-protocol storage appliance that serves both file and block protocol access to information stored on storage devices, such as disks 130. A plurality of storage systems 120 may be interconnected (e.g., by a cluster switching fabric 150) as nodes of a storage system cluster that cooperate to provide a distributed storage system architecture of the cluster. Notably, each storage system 120 and client 102 executes a virtual machine operating system 200, such as an illustrative VMware® virtual machine operating system, although other virtual machine operating systems, such as Xen and the Linux Kernel Virtual Machine (LKVM), may alternatively be used in accordance with embodiments of the present invention.

In an illustrative embodiment, each client 102 may be a general-purpose computer having a multi-processor architecture comprising processing elements and/or logic circuitry configured to execute software code and manipulate data structures. In addition, the client may be configured to interact with the storage system 120 in accordance with a client/server model of information delivery. That is, the client may request the services of the storage system node, and the node may return the results of the services requested by the client, by exchanging packets over the network 110. The client may issue packets including file-based access protocols, such as the Common Internet File System (CIFS) protocol or Network File System (NFS) protocol, over the Transmission Control Protocol/Internet Protocol (TCP/IP) when accessing information in the form of data containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of data containers, such as blocks.

The storage system 120 is illustratively a computer comprising one or more processors 122, a memory 124, a network adapter 126 and a storage adapter 128 interconnected by a system bus 125. The memory 124 illustratively comprises storage locations that are addressable by the processors and adapters for storing software program code and data structures associated with an illustrative embodiment described herein. The processor and adapters may, in turn, comprise processing elements and/or logic circuitry configured to execute the software code and manipulate the data structures. The network adapter 126 illustratively comprises a plurality of ports adapted to couple the storage system 120 to the clients 102 over network 110 embodied as point-to-point links, wide area networks, virtual private networks implemented over a public network (Internet) or a shared local area network. The network adapter 126 thus may comprise the mechanical, electrical and signaling circuitry needed to connect the storage system 120 to the network 110. Illustratively, the computer network 110 may be further embodied as an Ethernet network or a Fibre Channel (FC) network.

The storage adapter 128 cooperates with the virtual machine operating system 200 executing on the storage system 120 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage devices, such as disks 130. The storage adapter comprises a plurality of ports having input/output (I/O) interface circuitry that couples to the disks over an I/O interconnect arrangement, such as a conventional high-performance, FC link topology.

As multi-processor clients and/or storage system nodes increase in processing power (using, e.g., a multi-processor architecture), it may make economic sense to execute a number of guest operating systems (or instantiations of a guest operating system) of the virtual machine operating system 200 instead of acquiring a number of physical hardware systems. For example, each client 102 of the virtualized compute cluster 106 may execute instances (e.g., two) of the same guest operating system, such as the conventional Linux operating system, disposed over the virtual machine operating system 200 to use the available processing bandwidth provided by the clients of the cluster. Alternatively, the client may execute a heterogeneous pairing of guest operating systems, e.g., a Microsoft Windows based guest operating system paired with a Linux based guest operating system. Similarly and as described further herein, each storage system 120 may execute an instance of a guest operating system, such as a storage operating system. Alternatively, the storage system node may execute a plurality of guest/storage operating systems within a storage system cluster configuration to, inter alia, efficiently service the clients of the virtualized compute cluster 106.

Figure 2:
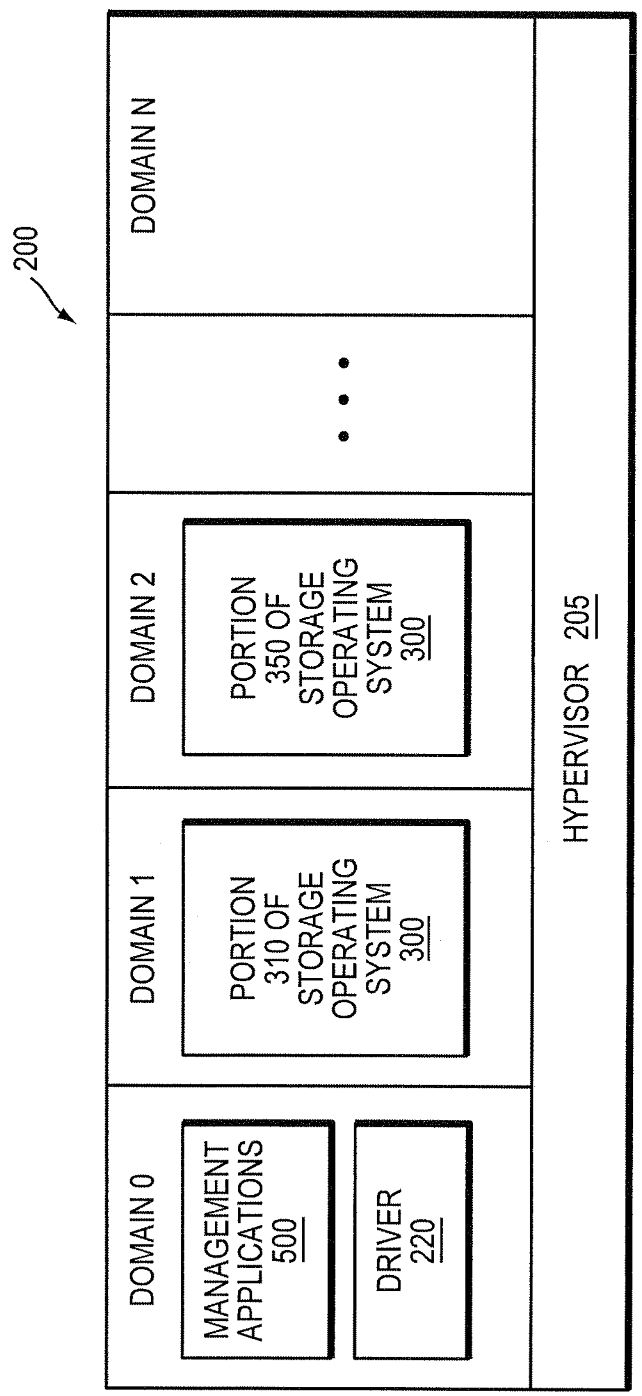
FIG. 2 is a schematic block diagram of an exemplary virtual machine operating system in accordance with an illustrative embodiment of the present invention.

FIG. 2 is a schematic diagram of an exemplary virtual machine operating system 200 in accordance with an illustrative embodiment of the present invention. As noted, the virtual machine operating system 200 illustratively comprises the VMware virtual machine operating system including, e.g., a VMware ESX Server; however, it should be noted that the present invention may be utilized in other virtual machine operating systems. For example, the invention may be utilized with virtual machine operating systems available from Microsoft, Xen, LKVM or the like. As such, the description of the VMware virtual machine operating system should be taken as exemplary only. The virtual machine operating system 200 comprises a virtualization layer or module ("hypervisor 205") configured to mask low-level hardware operations from one or more guest operating systems executing on the virtual machine operating system 200. As used herein, a hypervisor is a virtualization platform that permits the guest operating systems (or portions of a guest operating system) to execute on a computer at the same time.

Illustratively disposed over the hypervisor module 205 is a plurality of domains, for example, Domain 0, 1, 2 etc. Each domain is representative of a virtual machine within which a guest operating system (or a portion thereof) executes. In the illustrative embodiment of the VMware virtual machine operating system, Domain 0 provides administrator functionality and, as such, may execute a guest operating system based kernel and/or one or more administrative modules, such as management applications 500 described further herein. Domain 0 may also include, for example, a plurality of software drivers 220 adapted to interface with various hardware components including, for example in the case of storage system node 120, network adapter 126 and storage adapter 128. The drivers 220 illustratively provide an interface for I/O operations issued by the guest operating system.

Each Domain 1 and 2 illustratively executes a guest operating system or a portion of a guest operating system. For example, in the case of a client 102, each Domain 1 and 2 executes an instance of a guest operating system, such as the Linux operating system, whereas in the case of storage system node 120, each Domain 1 and 2 executes a portion of one or more guest operating systems, such as a storage operating system 300. However, it should be noted that, in accordance with the principles of the present invention, other types of guest operating systems may be used. As such, the description of a storage operating system being utilized as the guest operating system of storage system 120 should be taken as exemplary only.

The storage operating system 300 implements a data layout engine, such as an illustrative write-anywhere file system, that cooperates with one or more virtualization modules to "virtualize" the storage space provided by storage devices, such as disks. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of named data containers, such as blocks on the disks that are exported as named logical unit numbers (luns).

In an illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "Data ONTAP" is employed, it should be taken broadly to refer to any storage operating system that is otherwise adaptable to the teachings of this invention.

Figure 3:
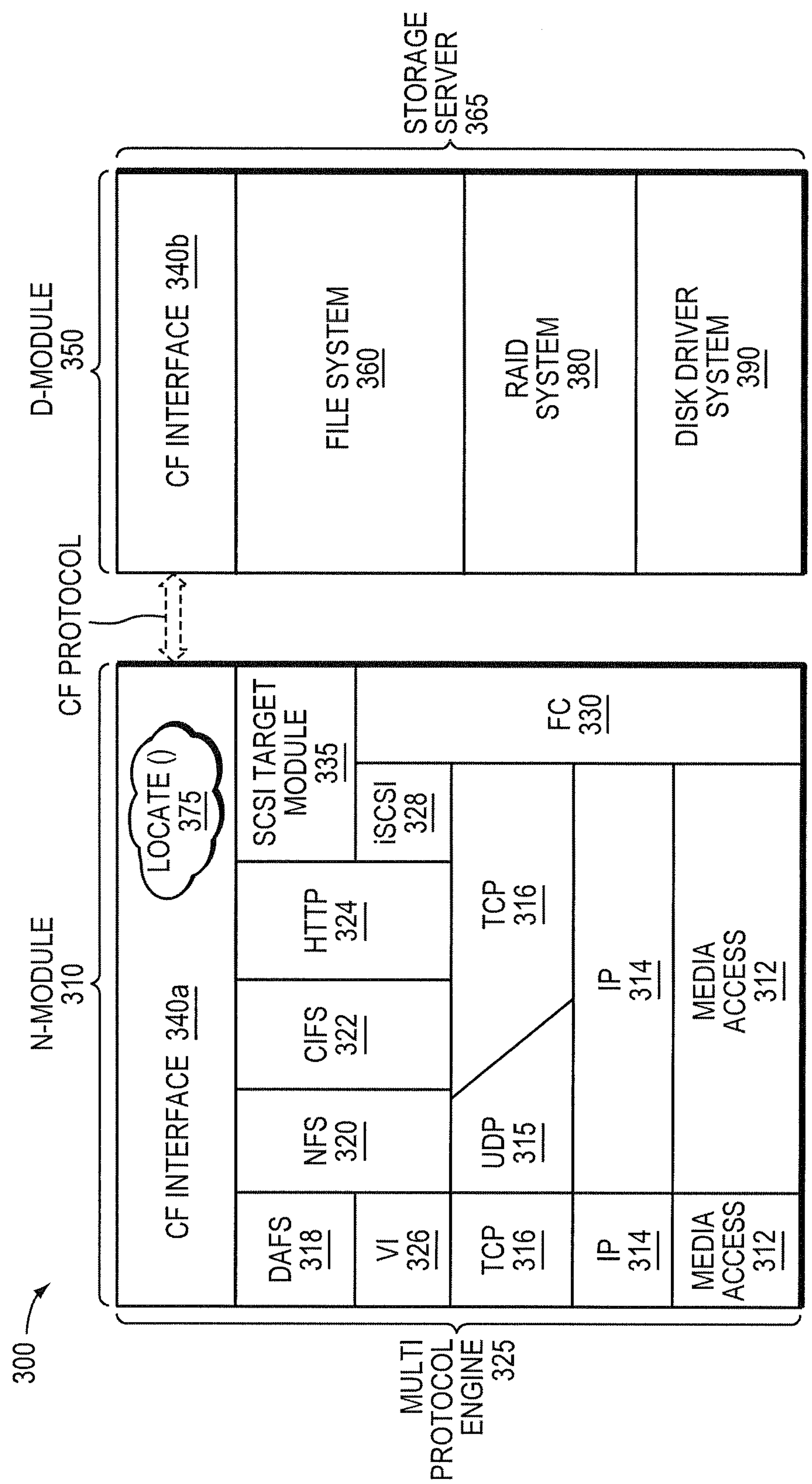
FIG. 3 is a schematic block diagram of an exemplary storage operating system that may be utilized as a guest operating system in a virtual machine environment in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the storage system node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system node 120.

In addition, the storage operating system includes a series of software layers organized to form a storage server 365 that provides data paths for accessing information stored on the disks 130 of the storage system node 120. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage/guest operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 510 (see FIG. 5) in response to a user (system administrator) issuing commands to the storage operating system 300. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 102 is forwarded as a packet over the network 110 and onto storage system node 120 where it is received at the network adapter 126. An appropriate network driver 220 of the virtual machine operating system 200 processes the packet and forwards it to the appropriate guest operating system, such as storage operating system 300. A network driver (of layer 312 or layer 330) processes the packet and, if appropriate, passes it on to a network protocol and file access layer for additional processing prior to forwarding to the file system 360. Here, the file system generates operations to load (retrieve) the requested data from disk 130 if it is not resident "in core", i.e., in memory 124. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the storage operating system returns a reply to the driver 220, which forwards the reply over the network adapter 126 to the client 102 over the network 110.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC).

As used herein, the term "storage operating system" generally refers to the computer-executable code operable on a computer to perform a storage function that manages data access and may, in the case of a guest operating system 300, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein. It should be noted that while this description is written in terms of a write-anywhere file system, the teachings of the present invention may be utilized with any suitable file system, including a write in-place file system.

In an illustrative embodiment, the storage server 365 is embodied as a disk module (D-module 350) of the storage operating system 300 to service one or more disks 130. In addition, the multi-protocol engine 325 is embodied as a network module (N-module 310) to (i) perform protocol termination with respect to a client issuing incoming data access request packets over the network 110, as well as (ii) redirect those data access requests to any storage server 365 of the storage operating system (e.g., guest operating system 300) within the storage system cluster. Accordingly, one portion of the storage operating system 300 executing in Domain 1 (FIG. 2) is illustratively the N-module 310, while another portion of the storage operating system 300 executing in Domain 2 is illustratively the D-module 350.

Moreover, the N-module 310 and D-module 350 cooperate to provide a highly-scalable, distributed storage system architecture. To that end, each module includes a cluster fabric (CF) interface module 340*a,b* adapted to implement communication among the modules, including D-module-to-D-module communication. The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-module 350 of the storage system cluster. Notably, the CF interface modules 340 cooperate to provide a single file system image across all D-modules 350. Thus, any network port of an N-module that receives a client request can access any data container within the single file system image located on any D-module 350.

Further to the illustrative embodiment, the N-module 310 and D-module 350 are implemented as separately-scheduled processes of guest operating system 300; however, in an alternate embodiment, the modules may be implemented as pieces of code within a single operating system process. Communication between an N-module and D-module is thus illustratively effected through the use of message passing between the modules. A known message-passing mechanism provided by the operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in U.S. Patent Application Publication No. US 2002/0116593.

The CF interface module 340 implements the CF protocol for communicating file system commands among the N-/D-modules of the virtual machine operating system 200. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same domain or (ii) a remote procedure call (RPC) when communicating the command to a D-module residing on a different domain of the virtual machine operating system 200. In either case, the CF decoder of CF interface 340*b* on D-module 350 de-encapsulates the CF message and processes the file system command.

Figure 4:
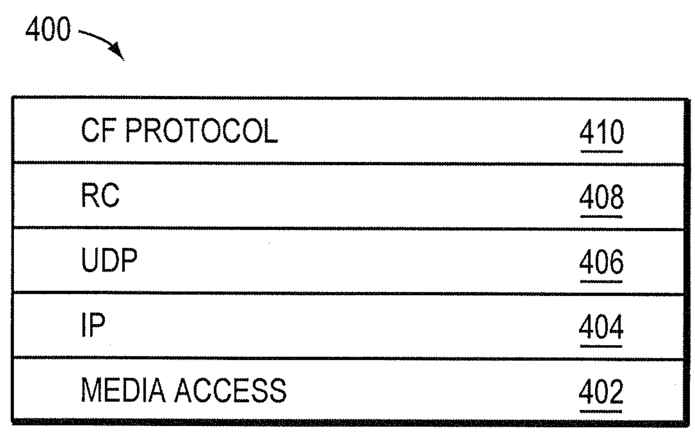
FIG. 4 is a schematic block diagram of an exemplary cluster fabric protocol data structure in accordance with an illustrative embodiment of the present invention.

FIG. 4 is a schematic block diagram illustrating the format of a CF message 400 in accordance with an embodiment of with the present invention. The CF message 400 is illustratively used for RPC communication between remote modules of the same or different guest operating system 300; however, it should be understood that the term "CF message" may be used generally to refer to LPC and RPC communication between modules of the virtual machine operating system 200. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the storage system 120; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
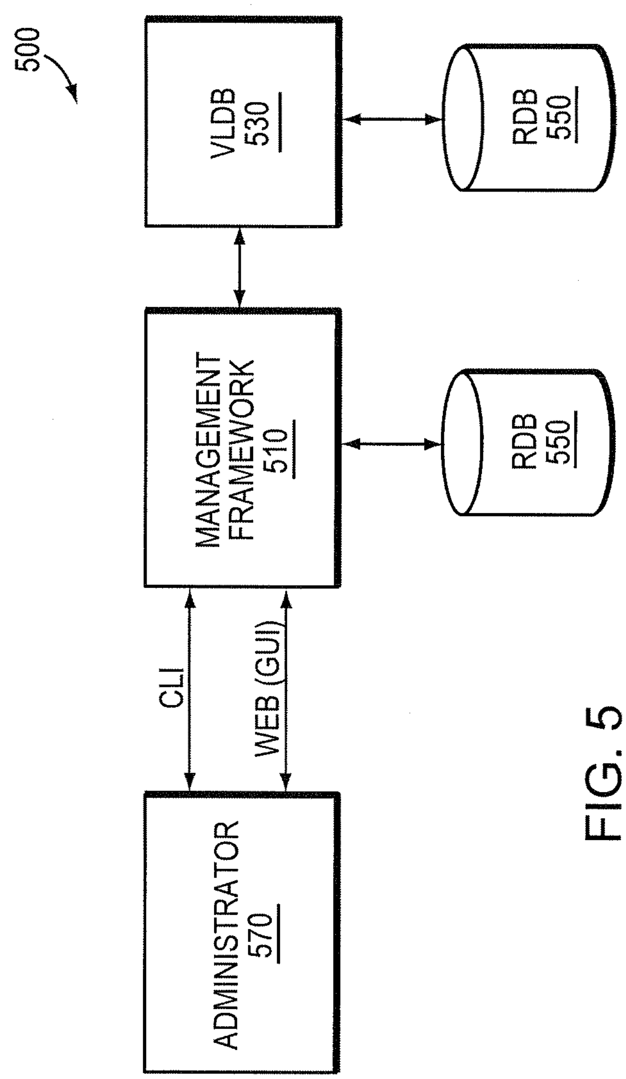
FIG. 5 is a schematic diagram illustrating a collection of management applications in accordance with an illustrative embodiment of the present invention.

FIG. 5 is a schematic block diagram illustrating a collection of user mode processes that execute as management applications 500 of the guest operating system 300 to provide management of configuration information (i.e. management data) for the guest operating system. To that end, the management applications/processes include a management framework process 510 and a volume location database (VLDB) process 530, each utilizing a data replication service (RDB 550) linked as a library. The management framework 510 provides a user to an administrator 570 interface via a command line interface (CLI) and/or a web-based graphical user interface (GUI). The management framework is illustratively based on a conventional common interface model (CIM) object manager that provides the entity to which users/system administrators interact with the guest operating system, such as a storage operating system 300.

The VLDB 530 is a database process that implements a namespace for, among other things, tracking the locations of various storage components (e.g., flexible volumes, aggregates, etc.) among various storage operating systems 300. Flexible volumes (hereinafter "volumes") and aggregates are further described in U.S. Publication No. 2005/0246401, now issued as U.S. Pat. No. 7,409,494 on Aug. 5, 2008, entitled Extension of Write Anywhere File System Layout, by John K. Edwards, et al., the contents of which are hereby incorporated by reference. Illustratively, the VLDB includes a plurality of entries used to keep track of the locations of the volumes and aggregates within the storage system cluster. Examples of such VLDB entries include a VLDB volume entry 600 and a VLDB aggregate entry 700.

Figures 6, 7:
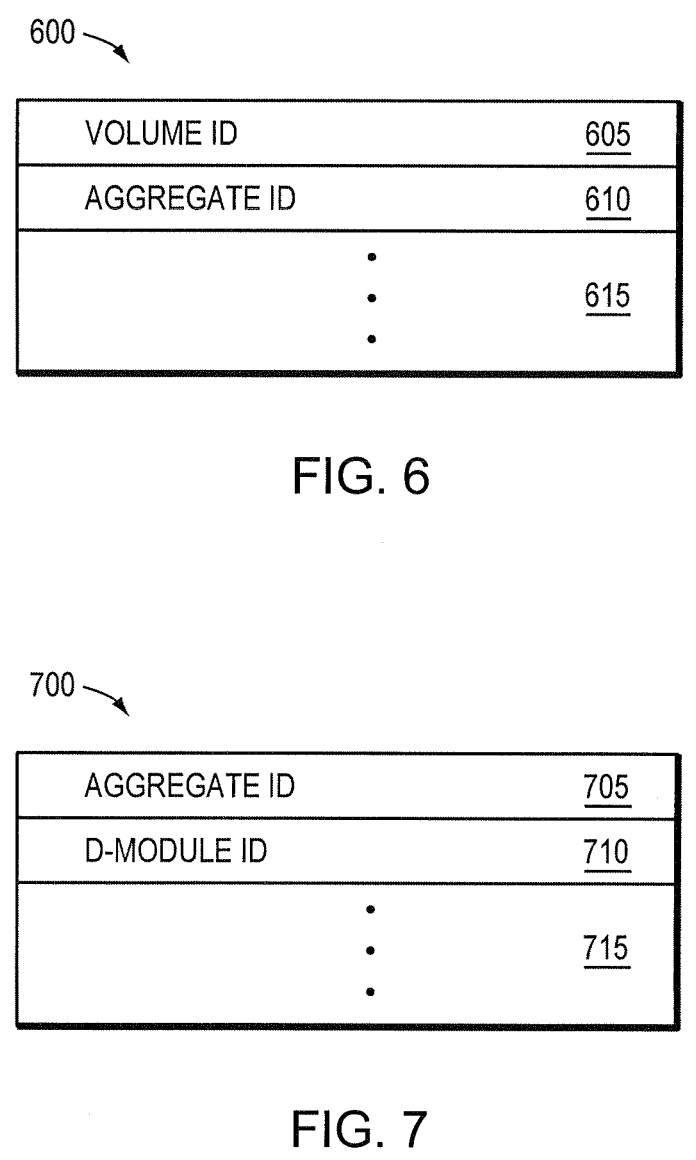

FIG. 6 is a schematic block diagram of an exemplary VLDB volume entry 600. The entry 600 includes a volume identifier (ID) field 605, an aggregate ID field 610 and, in alternate embodiments, additional fields 615. The volume ID field 605 contains an ID that identifies a volume used in a volume location process. The aggregate ID field 610 identifies the aggregate containing the volume identified by the volume ID field 605. Likewise, FIG. 7 is a schematic block diagram of an exemplary VLDB aggregate entry 700. The entry 700 includes an aggregate ID field 705, a D-module ID field 710 and, in alternate embodiments, additional fields 715. The aggregate ID field 705 contains an ID of a particular aggregate. The D-module ID field 710 contains an ID of the D-module hosting the particular aggregate identified by the aggregate ID field 705.

The VLDB illustratively implements a RPC interface, e.g., a Sun RPC interface, which allows the N-module 310 to query the VLDB 530. When encountering contents of a data container handle, the N-module sends an RPC to the VLDB process. In response, the VLDB 530 returns to the N-module the appropriate mapping information, including an ID of the D-module that owns the data container. The N-module caches the information in, e.g., a configuration table and uses the D-module ID to forward the incoming request to the appropriate data container. All functions and interactions between the N-module 310 and D-module 350 are coordinated on a virtual machine operating system-wide basis through the collection of management processes and the RDB library applications.

To that end, the management processes have interfaces to (are closely coupled to) RDB 550. The RDB comprises a library that provides a persistent object store (storing of objects) for the management data processed by the management processes. Notably, the RDB 550 replicates and synchronizes the management data object store access across all nodes of the storage system cluster to thereby ensure that the RDB database image is identical on all of the domains of the virtual machine operating systems executing on those nodes. At system startup, each guest operating system records the status/state of its interfaces and IP addresses (those IP addresses it "owns") into the RDB database.

The present invention is directed to a system and method for employing one or more clients 102 of virtualized compute cluster 106 as an execution engine for a portion of storage operating system 300 implemented as a virtual machine on storage system node 120 of a storage system cluster. As noted, each storage system node 120 and client 102 executes a virtual machine operating system 200 comprising a hypervisor module 205 configured to mask low-level hardware operations from one or more guest operating systems executing on the virtual machine operating system. A plurality of domains is illustratively disposed over the hypervisor module 205, wherein each domain is representative of a virtual machine within which a guest operating system (or a portion thereof) executes.

According to the invention, an N-module may be ported as a virtual machine from a node of the storage system cluster to a client to absorb (utilize) available processing bandwidth of the virtualized compute cluster. That is, if there is processing bandwidth of the client that is not fully utilized (e.g., at least one processor of the multi-processor architecture of the client is under utilized) and if the load on the storage system node is high, the invention enables porting of the N-module to the client of the compute cluster to thereby utilize the under-utilized processor as an execution engine in a manner that externally distributes the storage architecture from the storage system cluster. Thereafter, instances of the ported N-module may be spawned any number of times to execute over the hypervisor module within any number of clients of the compute cluster to absorb available processing bandwidth of the cluster. Advantageously, the invention increases the processing performance of the storage system cluster by, among other things, offloading some of the network processing load from the storage system node.

As used herein, the term "port" denotes a change in location of a software module (e.g., executing on a virtual machine) from an operating system environment (e.g., a virtual operating system environment) in which it was developed to another operating system environment at which it can be run. For example, use of the term "port" may include creation of an entirely new instance of an N-module and execution of that N-module instance on a processor of the client of the virtualized compute cluster (instead of on the guest/storage operating system of a storage system node).

In addition, the term "port" may include migration of the N-module from the storage system node to the client. Migration, in this context, may be effected through use of hypervisor properties that allow propagation of a virtual machine running an existing software component, such as an N-module, to another physical platform. Broadly stated, data and program state of the N-module is captured and saved (i.e., checkpointed), and the N-module is shut down. The checkpointed state of the N-module is then propagated over to the client, so that the N-module may be restarted to resume processing where it left off. In an illustrative embodiment, a virtual machine running an N-module may be migrated from a storage system node to a client of the virtualized compute cluster using a conventional migration system, such as the VMotion migration system available from VMware, Inc. The VMotion migration system is well-known and described in a paper titled, Fast Transparent Migration for Virtual Machines, by Michael Nelson et al., Proceedings of USENIX '05: General Track, USENIX Association, April 2005, which paper is hereby incorporated by reference as though fully set forth herein.

Figure 8:
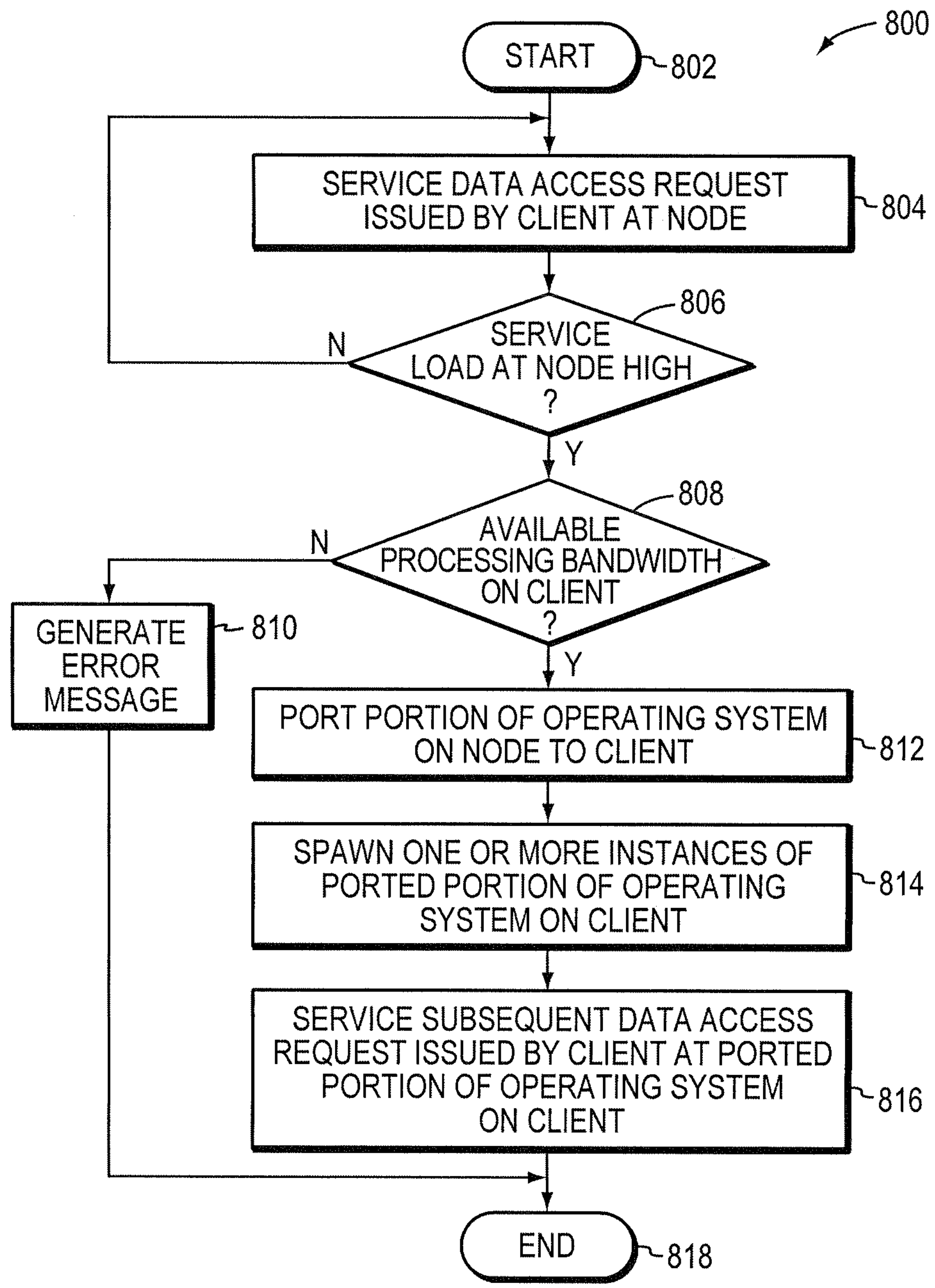
FIG. 8 is a flowchart illustrating a procedure for employing one or more clients of a virtualized compute cluster as an execution engine for a portion of a storage operating system implemented as a virtual machine on a storage system node of a storage system cluster in accordance with the present invention.

FIG. 8 is a flowchart illustrating a procedure for employing one or more clients of a virtualized compute cluster as an execution engine for a portion of a storage operating system implemented as a virtual machine on a storage system node of a storage system cluster in accordance with the present invention. The procedure 800 starts at Step 802 and proceeds to Step 804 where a storage system node of the storage system cluster services a data access request issued by a client of the virtualized compute cluster. In Step 806, a determination is made as to whether the service load on the node (i.e., relating to servicing of data access requests) is high. Note that, in an illustrative embodiment, determination of a high service load may be rendered if the load surpasses a predetermined threshold level. If the load is not high, the procedure returns to Step 804 where the node services another data access request.

However, if the service load is determined to be high, then a determination is made (Step 808) as to whether there is processing bandwidth on the clients that is not fully utilized and, thus, available for use by the storage system node. In the illustrative embodiment, determination of available processing bandwidth on the client is made using conventional policy-based, load management tools. If there is no available processing bandwidth on the client, an error message is generated and provided to the administrator via, e.g., the administrator user interface of the management framework at Step 810 and the procedure ends at Step 818. Yet, if there is available processing bandwidth on the client, the portion of the storage operating system implemented as a virtual machine, e.g., an N-module, on the storage system node is ported to the client in Step 812. In Step 814, one or more instances of the ported portion of the storage operating system is spawned to execute over the hypervisor module of the virtual operating system executing on the client to absorb available processing bandwidth of the compute cluster. In Step 816, the portion (and/or the spawned instance) of the storage operating system services a subsequent data access request issued by the client by, inter alia, forwarding the request to another portion of the storage operating system implemented as a virtual machine, e.g., a D-module, on the storage system node. Note that the ported portion of the storage operating system (e.g., N-module) forwards the request to the other portion of the storage operating system (e.g., D-module) by encapsulating one or more CF messages 400 over conventional network messaging (such as TCP/IP) to thereby enable, e.g., N-module to D-module communication, as described herein. The procedure then ends at Step 818.

While there have been shown and described illustrative embodiments for employing one or more clients of a virtualized compute cluster as an execution engine for a portion of a storage operating system implemented as a virtual machine on a storage system node of a storage system cluster, it is to be understood that various other adaptations and modifications may be made within the spirit and scope of the present invention. For example, in other embodiments of the invention, the ported N-module may be configured to cache certain data used to service certain data access requests from one or more clients of the virtualized compute cluster. The storage system environment of these embodiments may incorporate a vertical-scaling network configuration wherein the ported N-module is configured to provide a form of network caching that exploits the location of the module closer to the consumers (i.e., clients) that actually access the data. Illustratively, the ported N-module may be configured to provide caching of data using a flexible number of cache control policies and protocols, such as NFS, NRV, SpinNP, etc.

Illustratively, in one such embodiment, the ported N-module may be configured with non-persistent, volatile cache storage, i.e., of a virtualized compute cluster client, implemented with a write-through cache coherency policy to prevent data loss. In another embodiment, the ported N-module may be configured with persistent cache storage utilizing non-volatile memory of the client and implemented with write-through, write-back or other similar policies to ensure cache coherency in the externally-distributed storage system cluster architecture. Here, the non-volatile memory is illustratively embodied as a large-volume, solid-state random access memory array having either a back-up battery or other built-in last-state-retention capabilities (e.g., FLASH memory). In still yet another embodiment, the VLDB namespace may be apportioned among a plurality of ported (and/or spawned) N-modules configured to cooperatively interact to implement shared cache coherency policies in the externally-distributed architecture. These embodiments of the invention advantageously accelerate I/O performance of the storage system services by allowing the N-module(s) to operate closer to the consumers (i.e., clients) of those services.

The foregoing description has been directed to specific embodiments of this invention. It will be apparent, however, that other variations and modifications may be made to the described embodiments, with the attainment of some or all of their advantages. For instance, it is expressly contemplated that the components, elements, modules and/or structures described herein can be implemented as software, including a computer-readable medium having program instructions executing on a computer, hardware, firmware, or a combination thereof. Also, electromagnetic signals may be generated to carry computer executable instructions that implement the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to employ a virtualized compute cluster as an execution engine for a storage system node, the system comprising:

a first portion of a storage operating system executing on the storage system node, the first portion of the storage operating system ported as a virtual machine from the storage system node to a client of the virtualized compute cluster to utilize available processing bandwidth of the virtualized compute cluster, wherein the first portion of the storage operating system is a network module embodied as a network-facing portion of the storage operating system that terminates a network connection for a network access request using a data access protocol; and a second portion of the storage operating system executing on the storage system node configured to service a data access request generated by an instance of the ported virtual machine, wherein servicing the data access request includes forwarding the data access request to the second portion of the storage operating system, wherein the data access request corresponds to the network access request, wherein the first portion of the storage operating system is configured to cache data from service of the data access request, wherein the first portion of the storage operating system is configured to use a cache coherency policy to cache the data from service of the data access request, and wherein the first portion of the storage operating system is configured to return the cached data in response to the network access request.

2. The system of claim 1 wherein the network facing portion of the storage operating system comprises software layers organized to form a network protocol stack, the network protocol stack configured to provide a data path to access information stored on the storage system node.

3. The system of claim 1 further comprising a virtual machine operating system executing on the client and the storage system node, the virtual machine operating system comprising a hypervisor module configured to mask low-level hardware operations from a guest operating system executing on the virtual machine operating system.

4. The system of claim 3 further comprising a plurality of domains disposed over the hypervisor module, each domain representative of a virtual machine within which the first portion of the guest operating system executes.

5. The system of claim 1 wherein the cache coherency policy is one of write-through and write-back.

6. The system of claim 1 wherein a plurality of ported first portions of the storage operating system is configured to implement a shared cache coherency policy.

7. The system of claim 1 wherein the client of the virtualized compute cluster comprises a persistent cache storage.

8. A method for employing a virtualized compute cluster as an execution engine for a storage system node, the method comprising:

determining whether a service load on the storage system node is high;

if the service load is high, determining whether there is processing bandwidth on at least one client of the virtualized compute cluster that is not fully utilized; and if there is processing bandwidth not fully utilized, porting a first portion of a storage operating system executing on the storage system node as a first virtual machine from the node to the client to utilize that processing bandwidth of the virtualized compute cluster, wherein the first portion of the storage operating system ported as the first virtual machine is a network element embodied as a network protocol stack configured to provide at least one data path for the client to access information stored on the storage system node using a data access protocol, wherein the first portion of the storage operating system is configured to cache data information stored on the system storage system, wherein the first portion of the storage operating system is configured to use a cache coherency policy to cache the data from service of a data access request, and wherein servicing of the data access request includes terminating a network connection and forwarding of the data access request to the storage system node.

9. The method of claim 8 further comprising executing a virtual machine operating system on the client and the storage system node, the virtual machine operating system comprising a hypervisor module configured to mask low-level hardware operations from a guest operating system executing on the virtual machine operating system.

10. The method of claim 9 further comprising disposing a plurality of domains over the hypervisor module, each domain representative of a virtual machine within which a portion of the guest operating system executes.

11. The method of claim 10 wherein the guest operating system is the storage operating system and wherein the portion of the guest operating system is a network-facing portion of the storage operating system.

12. The method of claim 9 further comprising spawning instances of the first portion of the storage operating system to execute over the hypervisor module of the virtual operating system executing on the client to absorb available processing bandwidth of the virtualized compute cluster.

13. The method of claim 12 further comprising servicing the data access request issued by the client at one of the spawned instances of the first portion of the storage operating system.

14. The method of claim 13 wherein forwarding of the data access request comprises forwarding of the request to a second portion of the storage operating system implemented as a second virtual machine on the storage system node.

15. The method of claim 14 wherein the second portion of the storage operating system is a disk module embodied as a storage server to service one or more disks of the node.

16. The method of claim 8 wherein the cache coherency policy is one of write-through and write-back.

17. The method of claim 8 further comprising:

storing data from service of the data access request to a non-volatile memory.

18. A method for employing a virtualized compute cluster as an execution engine for a storage system cluster, the method comprising:

servicing a data access request at a storage system node of the storage system cluster, the data access request issued by a client of the virtualized compute cluster;

determining whether a service load on the storage system node is high;

if the service load is high, determining whether there is processing bandwidth on the client that is not fully utilized; and if there is processing bandwidth not fully utilized, porting a network module of a storage operating system executing on the storage system node as a virtual machine from the node to the client to utilize that processing bandwidth of the virtualized compute cluster, the network module configured to provide a data path for the client to access information stored on the storage system node, wherein the network module of the storage operating system is configured to cache data information stored on the system storage system, wherein the network module of the storage operating system is configured to use a cache coherency policy to cache the data from service of the data access request, and wherein servicing the data access request includes terminating a network connection and forwarding the data access request to the storage system node.

19. The method of claim 18 further comprising executing a virtual machine operating system on the client and storage system node, the virtual machine operating system comprising a hypervisor module configured to mask low-level hardware operations from at least one guest operating system executing on the virtual machine operating system.

20. The method of claim 18 further comprising: sending, by the ported network module of the storage operating system, a message comprising an identifier of a node in the storage system cluster.

21. The method of claim 18 wherein a volume location database namespace is apportioned among a plurality of ported first portions of the storage operating system.

22. A system configured to employ a virtualized compute cluster as an execution engine for a storage system cluster, the system comprising:

a plurality of clients of the virtualized compute cluster, at least one client having a multi-processor architecture adapted to execute software code and wherein a processor of the multi-processor architecture is under-utilized; and a storage system node of the storage system cluster, the storage system node adapted to execute a portion of a storage operating system, the portion of the storage operating system ported as a virtual machine from the storage system node to the at least one client to utilize the under- utilized processor, wherein the portion of the storage operating system is a network module embodied as a network-facing portion of the storage operating system that terminates a network connection for a network access request using a data access protocol, wherein the portion of the storage operating system is configured to cache data from service of a data access request, wherein the portion of the storage operating system is configured to use a cache coherency policy to cache the data from service of the data access request, and wherein servicing the data access request includes forwarding the data access request to the storage system node.

23. The system of claim 22 wherein the under-utilized processor of the virtualized compute cluster is utilized as the execution engine for the storage system cluster.

24. The system of claim 22 wherein the portion of the storage operating system is a network module embodied as a network-facing portion of the storage operating system that terminates a network connection for a data access protocol from the at least one client of the virtualized compute cluster.

* * * * *